(12) United States Patent
Uehara et al.

(10) Patent No.: US 11,739,819 B2
(45) Date of Patent: Aug. 29, 2023

(54) POWER TRANSMISSION DEVICE

(71) Applicant: JATCO LTD, Fuij (JP)

(72) Inventors: Hiroki Uehara, Kanagawa (JP);
Masumi Fujikawa, Kanagawa (JP);
Toshikazu Oshidari, Kanagawa (JP)

(73) Assignee: Jatco Ltd, Fuji (JP)

( * ) Notice: Subject to any disclaimer, the term of this patent is extended or adjusted under 35 U.S.C. 154(b) by 111 days.

(21) Appl. No.: 17/428,519

(22) PCT Filed: Nov. 12, 2019

(86) PCT No.: PCT/JP2019/044220
§ 371 (c)(1),
(2) Date: Aug. 4, 2021

(87) PCT Pub. No.: WO2020/161977
PCT Pub. Date: Aug. 13, 2020

(65) Prior Publication Data
US 2022/0128140 A1    Apr. 28, 2022

(30) Foreign Application Priority Data
Feb. 8, 2019    (JP) .................................. 2019-022130

(51) Int. Cl.
*F16H 37/08*    (2006.01)
*B60K 1/00*    (2006.01)
(Continued)

(52) U.S. Cl.
CPC .............. *F16H 37/082* (2013.01); *B60K 1/00* (2013.01); *H02K 7/006* (2013.01); *H02K 7/116* (2013.01); *B60K 2001/001* (2013.01)

(58) Field of Classification Search
CPC .......... F16H 37/082; F16H 1/46; F16H 48/08; B60K 1/00; B60K 2001/001; H02K 7/006; H02K 7/116
(Continued)

(56) References Cited

U.S. PATENT DOCUMENTS 8,459,134 B2 *    6/2013    Harashima ............... F16H 3/003
74/325
9,829,084 B2 *    11/2017    Swales .................... F16H 48/06
(Continued)

FOREIGN PATENT DOCUMENTS

JP    2001-330111 A    11/2001
JP    2005-125920 A    5/2005
(Continued)

*Primary Examiner* — Leslie A Nicholson, III
(74) *Attorney, Agent, or Firm* — Global IP Counselors, LLP

(57) ABSTRACT

A power transmission device includes a motor including a rotor, a first planetary reduction gear connected downstream of the motor, a second planetary reduction gear connected downstream of the first planetary reduction gear, a differential gear connected downstream of the second planetary reduction gear, and a drive shaft connected downstream of the differential gear. The first planetary reduction gear includes a sun gear and a pinion gear that is a stepless pinion. The second planetary reduction gear includes a sun gear and a pinion gear that is a stepped pinion. The drive shafts is penetrating an inner circumference of the rotor of the motor, an inner circumference of the sun gear of the first planetary reduction gear, and an inner circumference of the sun gear of the second planetary reduction gear.

10 Claims, 2 Drawing Sheets

(51) Int. Cl.
*H02K 7/00* (2006.01)
*H02K 7/116* (2006.01)

(58) Field of Classification Search
USPC .......................................................... 475/150
See application file for complete search history.

(56) References Cited

U.S. PATENT DOCUMENTS

| | | | |
|---|---|---|---|
| 11,067,152 B2* | 7/2021 | Biermann | ................. F16H 3/66 |
| 2005/0143210 A1 | 6/2005 | Hamai et al. | |
| 2009/0111641 A1* | 4/2009 | Kim | .................... B60K 17/043 |
| | | | 477/5 |
| 2015/0013488 A1 | 1/2015 | Matsuoka et al. | |
| 2015/0377334 A1* | 12/2015 | Swales | ................... B60K 17/16 |
| | | | 475/220 |
| 2016/0123454 A1 | 5/2016 | Tahara et al. | |
| 2018/0180162 A1 | 6/2018 | Hakuta et al. | |
| 2019/0316655 A1* | 10/2019 | Osada | .................... F16H 3/724 |
| 2020/0116236 A1* | 4/2020 | Biermann | ............... F16H 48/11 |
| 2020/0282828 A1* | 9/2020 | Suyama | .............. F16H 57/0447 |

FOREIGN PATENT DOCUMENTS

| | | |
|---|---|---|
| JP | 2011-256969 A | 12/2011 |
| JP | 2013-221566 A | 10/2013 |
| JP | 2016-089860 A | 5/2016 |
| JP | 2018-103676 A | 7/2018 |
| WO | 2018/188691 A1 | 10/2018 |

* cited by examiner

POWER TRANSMISSION DEVICE

CROSS-REFERENCE TO RELATED APPLICATIONS

This is a U.S. national phase application of PCT/JP2019/044220, filed on Nov. 12, 2019, which claims priority to Japanese Patent Application No. 2019-022130, filed on Feb. 8, 2019. The entire disclosure of Japanese Patent Application No. 2019-022130 is hereby incorporated herein by reference.

TECHNICAL FIELD

The present invention relates to a power transmission device.

BACKGROUND ART

In Japanese Laid-Open Patent Publication No. 2013-221566, Japanese Laid-Open Patent Publication No. 2016-89860, and Japanese Laid-Open Patent Publication No. 2018-103676, disclosed is a power transmission device.

The power transmission device of Japanese Laid-Open Patent Publication No. 2013-221566 has three rotation axes that are involved in rotation transmission aligned in parallel, and the size easily increases in the vertical direction (gravity direction) (hereafter called the "3-axis type").

In the power transmission device of Japanese Laid-Open Patent Publication No. 2016-89860, a rotor of a motor is a hollow shaft, and a drive shaft penetrates the interior of this hollow shaft. For that reason, compared to the 3-axis type, it is possible to reduce the size in the vertical direction, but due to placement of a large counter gear, it ends up increasing in size in the vertical direction (hereafter called the "2-axis type").

In the power transmission device of Japanese Laid-Open Patent Publication No. 2018-103676, rather than the counter gear, a planetary reduction gear having a stepped pinion is used, and compared to the 2-axis type, it is possible to reduce the size in the vertical direction (hereafter called the "1-axis type").

SUMMARY

In a 1-axis type power transmission device, there is a demand to make the reduction ratio greater while suppressing an increase in size.

One embodiment of the present disclosure is directed to a power transmission device having: a motor, a first planetary reduction gear connected downstream of the motor, a second planetary reduction gear connected downstream of the first planetary reduction gear, a differential gear connected downstream of the second planetary reduction gear, and a drive shaft connected downstream of the differential gear, wherein the drive shaft is arranged penetrating the inner circumference of a rotor of the motor, the inner circumference of a sun gear of the first planetary reduction gear, and the inner circumference of the sun gear of the second planetary reduction gear, and a pinion of the first planetary reduction gear is a stepless pinion, and the pinion of the second planetary reduction gear is a stepped pinion.

According to the embodiment, it is possible to make the reduction ratio greater while suppressing an increase in size.

DETAILED DESCRIPTION OF EMBODIMENTS

Following, embodiments of the present invention are explained.

Figure 1:
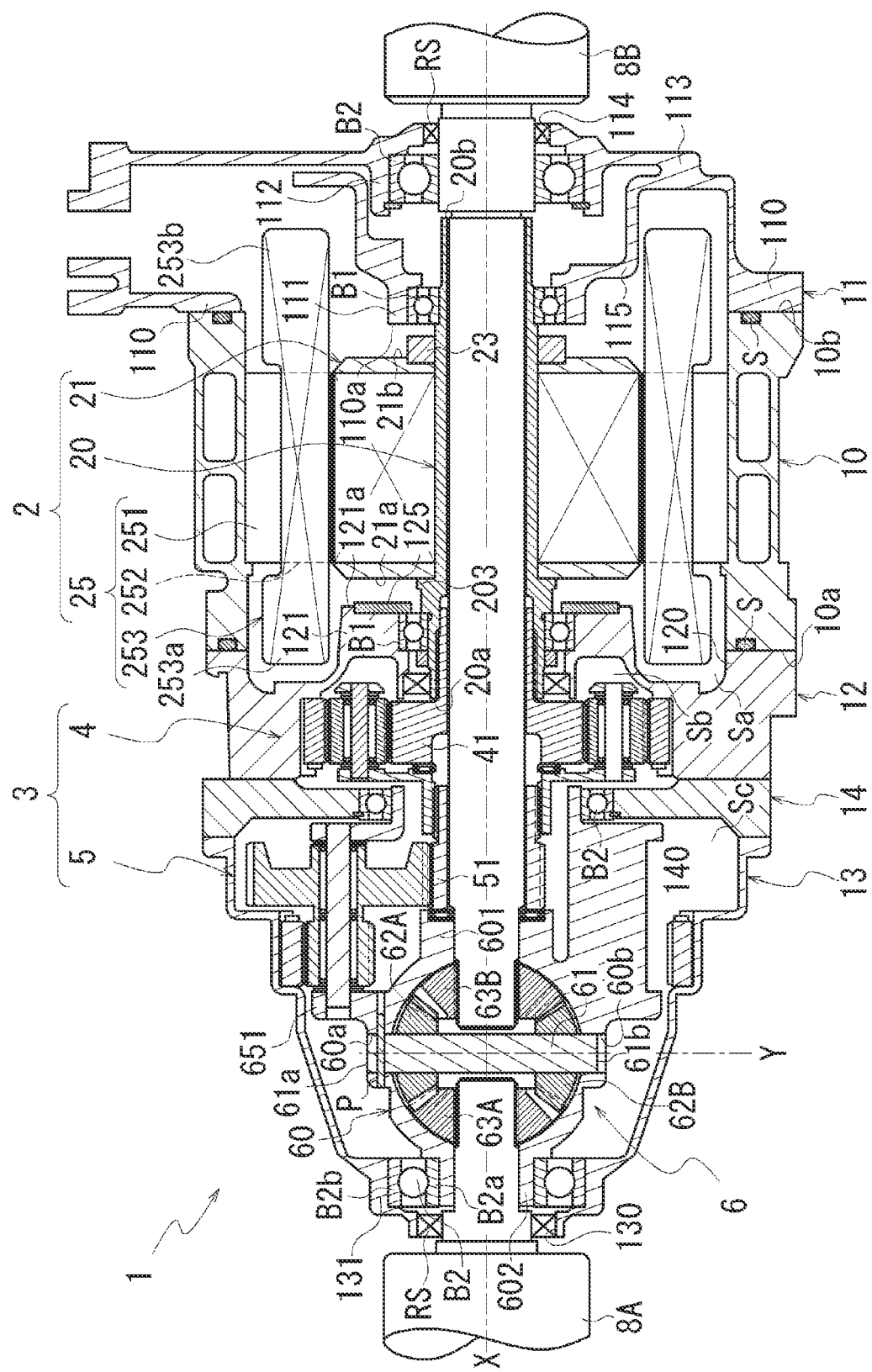
FIG. 1 is a drawing for explaining a power transmission device of the present embodiment.

FIG. 1 is a drawing for explaining a power transmission device 1 of the present embodiment.

Figure 2:
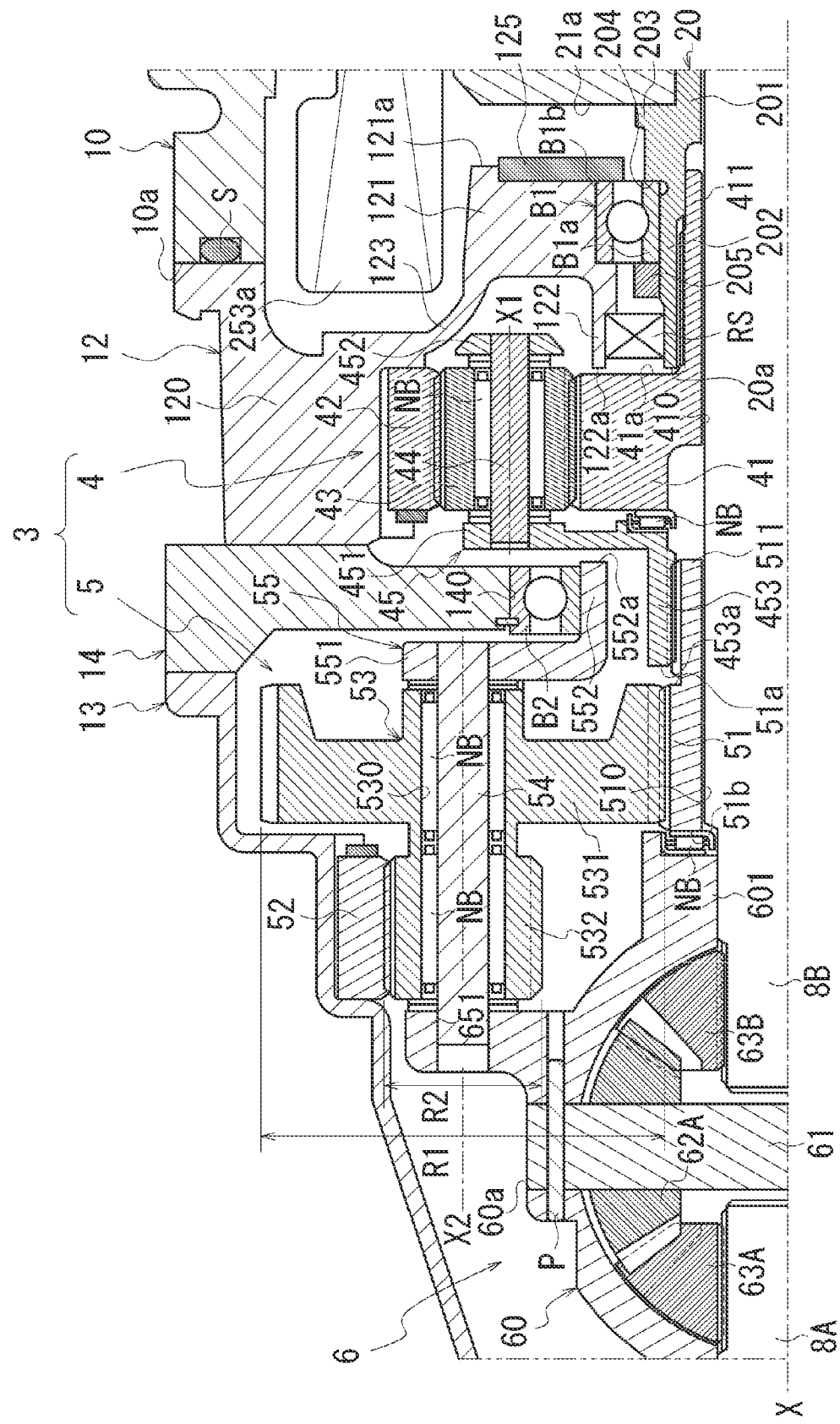
FIG. 2 is an enlarged view around a reduction mechanism of the power transmission device.

FIG. 2 is an enlarged view around a reduction mechanism 3 (first planetary reduction gear 4, second planetary reduction gear 5) of the power transmission device 1.

The power transmission device 1 has: a motor 2; the reduction mechanism 3 (first planetary reduction gear 4, second planetary reduction gear 5) that reduces output rotation of the motor 2 and inputs that to the differential device 6; and drive shafts 8 (8A, 8B).

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

The output rotation of the motor 2 is reduced by the reduction mechanism 3, and after being inputted to the differential device 6, is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the first planetary reduction gear 4 is connected downstream of the motor 2, and the second planetary reduction gear 5 is connected downstream of the first planetary reduction gear 4. The differential device 6 is connected downstream of the second planetary reduction gear 5, and the drive shafts 8, 8 are connected downstream of the differential device 6.

The motor 2 has: a cylindrical motor shaft 20; a cylindrical rotor core 21 externally fitted on the motor shaft 20; and a stator core 25 that surrounds the outer circumference of the rotor core 21 with a prescribed gap.

The motor shaft 20 is provided to be able to rotate relatively with respect to the drive shaft 8B in a state externally fitted on the drive shaft 8B.

With the motor shaft 20, bearings B1, B1 are externally fitted and fixed to the outer circumference of one end 20a side and another end 20b side in the longitudinal direction.

The one end 20a side of the motor shaft 20 is supported to be able to rotate by a cylindrical motor support unit 121 of an intermediate case 12 with the bearing B1 interposed.

The other end 20b side of the motor shaft 20 is supported to be able to rotate by a cylindrical motor support unit 111 of a cover 11 with the bearing B1 interposed.

The motor 2 has a motor housing 10 that surrounds the outer circumference of the rotor core 21 with a prescribed gap. With the present embodiment, the intermediate case 12 is joined to one end 10a of the motor housing 10, and the cover 11 is joined to the other end 10b of the motor housing 10.

Seal rings S, S are provided on the one end 10a and the other end 10b of the motor housing 10. The one end 10a of the motor housing 10 is joined without a gap to a ring-shaped base 120 of the intermediate case 12 by the seal ring S provided on that one end 10a.

The other end 10b of the motor housing 10 is joined without a gap to a ring-shaped junction part 110 of the cover 11 by the seal ring S provided on that other end 10b.

With the intermediate case 12, the base 120 and the motor support unit 121 are provided with the positions displaced in the rotation axis X direction.

With the present embodiment, when the intermediate case 12 is fixed to the one end 10a of the motor housing 10, the motor support unit 121 is made to be inserted inside the motor housing 10.

In this state, the motor support unit 121 is arranged facing a one end part 21a of the rotor core 21 with a gap being formed in the rotation axis X direction at the inner diameter side of a coil end 253a noted later (see FIG. 2).

Also, a connecting part 123 that connects the base 120 and the motor support unit 121 (see FIG. 2) is provided avoiding contact with the coil end 253a and a side plate 452 described later.

A bearing retainer 125 is fixed to an end surface 121a of the rotor core 21 side of the motor support unit 121.

The bearing retainer 125 has a ring shape when seen from the rotation axis X direction. The inner diameter side of the bearing retainer 125 abuts the side surface of an outer race B1b of the bearing B1 supported by the motor support unit 121 from the rotation axis X direction. The bearing retainer 125 prevents falling off of the bearing B1 from the motor support unit 121.

As shown in FIG. 1, with the cover 11, the junction part 110 and the motor support unit 111 are provided with the positions displaced in the rotation axis X direction.

With the present embodiment, when the junction part 110 of the cover 11 is fixed to the other end 10b of the motor housing 10, the motor support unit 111 is made to be inserted inside the motor housing 10.

In this state, the motor support unit 111 is arranged facing an other end part 21b of the rotor core 21 with a gap being formed in the rotation axis X direction at the inner diameter side of a coil end 253b described later.

A connecting part 115 that connects the junction part 110 and a side wall part 113 of the cover 11 is provided along the rotation axis X while avoiding contact with the coil end 253b and a support cylinder 112 described later.

Inside the motor housing 10, the rotor core 21 is arranged between the motor support unit 111 of the cover 11 side, and the motor support unit 121 of the intermediate case 12 side.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 203 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted, and the stator core 25 has a longer length in the rotation axis direction than the rotor core 21 by the amount of the coil ends 253a, 253b projecting in the rotation axis X direction.

It is also possible to adopt the stator core of a configuration in which the windings are concentrically wound on each of the plurality of teeth parts projecting to the rotor core 21 side.

With the motor shaft 20, the bearing B1 is press-fitted further to the outer circumference of the area of the one end 20a side than the large diameter part 203.

As shown in FIG. 2, with an inner race B1a of the bearing B1, one side surface of the rotation axis X direction abuts a step part 204 provided on the outer circumference of the motor shaft 20. With the inner race B1a, a ring-shaped stopper 205 that is press-fitted in the outer circumference of the motor shaft 20 abuts the other side surface.

With the bearing B1, the inner race B1a is positioned by the stopper 205 at a position abutting the step part 204.

The one end 20a of the motor shaft 20 is positioned more to the differential device 6 side (left side in the drawing) than the stopper 205. In the rotation axis X direction, the one end 20a faces a side surface 41a of a sun gear 41 of the first planetary reduction gear 4 with a gap being formed therebetween.

At the one end 20a side of the motor shaft 20, a cylinder wall 122 is positioned radially outward of the motor shaft 20.

The cylinder wall 122 projects to the differential device 6 side from the motor support unit 121, and a tip 122a of the cylinder wall 122 faces the side surface 41a of the sun gear 41 of the first planetary reduction gear 4 with a gap being formed therebetween.

The cylinder wall 122 surrounds the outer circumference of the motor shaft 20 with a prescribed gap, and a lip seal RS is arranged between the cylinder wall 122 and the motor shaft 20.

The lip seal RS is provided to partition a space Sa (see FIG. 1) of the inner diameter side of the motor housing 10 and a space Sb (see FIG. 1) of the inner diameter side of the intermediate case 12.

The space Sb of the inner diameter side of the intermediate case 12 is linked with a space Sc inside a case 13 that houses the differential device 6 described later, and lubricating oil of the differential device 6 is sealed within. The lip seal RS is provided to block inflow of lubricating oil to the space Sa of the inner diameter side of the motor housing 10.

As shown in FIG. 2, an area 202 of the one end 20a side of the motor shaft 20 is formed with a larger inner diameter than an area 201 on which the rotor core 21 is externally fitted.

A cylindrical linking part 411 of the sun gear 41 is inserted inside the area 202 of this one end 20a side. In this state, the area 202 of the one end 20a side of the motor shaft 20 and the linking part 411 of the sun gear 41 are spline fitted without being able to rotate relatively.

For this reason, the output rotation of the motor 2 is inputted to the sun gear 41 of the first planetary reduction gear 4 via the motor shaft 20, and the sun gear 41 rotates around the rotation axis X by the rotational drive power of the motor 2.

The sun gear 41 has the linking part 411 extending in the rotation axis X direction from the side surface 41a of the inner diameter side. The linking part 411 is formed integrally with the sun gear 41, and a through hole 410 is formed straddling the inner diameter side of the sun gear 41 and the inner diameter side of the linking part 411.

The sun gear 41 is supported to be able to rotate on the outer circumference of the drive shaft 8B penetrating the through hole 410.

A ring gear 42 fixed to the inner circumference of the base 120 of the intermediate case 12 is positioned at the outer diameter side of the sun gear 41 in the radial direction of the rotation axis X. In the radial direction of the rotation axis X, between the sun gear 41 and the ring gear 42, a pinion gear 43 that is supported to be able to rotate on a pinion shaft 44 is engaged with the outer circumference of the sun gear 41 and the inner circumference of the ring gear 42.

The pinion gear 43 is supported to be able to rotate at the outer circumference of the pinion shaft 44 via a needle bearing NB. The pinion shaft 44 penetrates the pinion gear 43 in the axis line X1 direction along the rotation axis X. One end and the other end of the longitudinal direction of the pinion shaft 44 is supported by a pair of side plates 451, 452 of a carrier 45.

The side plates 451, 452 are provided in parallel with each other with a gap being formed in the rotation axis X direction.

Between the side plates 451, 452, the plurality of pinion gears 43 are provided in a plurality (four, for example) at a prescribed interval in the circumferential direction around the rotation axis X.

A cylindrical linking part 453 is provided on the side plate 451 positioned at the differential device 6 side.

The linking part 453 in the side plate 451 is arranged concentrically with respect to the rotation axis X, and projects in the direction approaching the differential device 6 (leftward in the drawing) along the rotation axis X.

Viewed from the intermediate case 12, a ring shaped intermediate cover 14 is positioned at the differential device 6 side. The intermediate cover 14 is provided in a state sandwiched between the intermediate case 12 and the case 13.

The linking part 453 provided on the inner diameter side of the side plate 451 penetrates an opening 140 at the center of the intermediate cover 14 to the left of the differential device 6 side from the motor 2 side.

The tip 453a of the linking part 453 is positioned inside the case 13 attached to the intermediate cover 14. The tip 453a of the linking part 453 in the rotation axis X direction faces a side surface 51a of a sun gear 51 of the second planetary reduction gear 5 with a gap being formed.

A cylindrical linking part 511 extending from the sun gear 51 is inserted inside the linking part 453 and spline fitted, and the linking part 453 of the first planetary reduction gear 4 side and the linking part 511 of the second planetary reduction gear 5 side are linked without being able to rotate relatively.

The sun gear 51 has the linking part 511 extending in the rotation axis X direction from the side surface 51a of the inner diameter side. The linking part 511 is formed integrally with the sun gear 51, and a through hole 510 is formed straddling the inner diameter side of the sun gear 51 and the inner diameter side of the linking part 511.

The sun gear 51 is supported to be able to rotate on the outer circumference of the drive shaft 8B penetrating the through hole 510.

A side surface 51b of the differential device 6 side of the sun gear 51 faces a cylindrical support unit 601 of a differential case 60 described later with a gap being formed in the rotation axis X direction, and the needle bearing NB is interposed between the side surface 51b and the support unit 601.

The sun gear 51 engages with a large diameter gear part 531 of a stepped pinion gear 53 on an extension of the abovementioned linking part 542 of the first planetary reduction gear 4 side.

The stepped pinion gear 53 has the large diameter gear part 531 that engages with the sun gear 51, and a small diameter gear part 532 having a smaller diameter than the large diameter gear part 531.

The stepped pinion gear 53 is a gear component in which the large diameter gear part 531 and the small diameter gear part 532 are provided integrally, aligned in an axis line X2 direction that is parallel to the rotation axis X.

The stepped pinion gear 53 has a through hole 530 penetrating the inner diameter side of the large diameter gear part 531 and the small diameter gear part 532 in the axis line X2 direction.

The stepped pinion gear 53 is supported to be able to rotate on the outer circumference of a pinion shaft 54 penetrating the through hole 530 with the needle bearing NB interposed.

One end and the other end in the longitudinal direction of the pinion shaft 54 are supported by a side plate 651 integrally formed with the differential case 60, and a side plate 551 arranged on this side plate with a gap being formed.

The side plates 651, 551 are provided in parallel with each other with a gap being formed in the rotation axis X direction.

Between the side plates 651, 551, the plurality of stepped pinion gears 53 are provided in a plurality (three, for example) at a prescribed interval in the circumferential direction around the rotation axis X.

Each of the small diameter gear parts 532 is engaged with the inner circumference of the ring gear 52. The ring gear 52 is spline fitted with the inner circumference of the case 13, and relative rotation of the ring gear 52 with the case 13 is regulated.

At the inner diameter side of the side plate 551, a cylindrical part 552 is provided extending to the first planetary reduction gear 4 side. The cylindrical part 552 penetrates the opening 140 at the center of the intermediate cover 14 at the motor 2 side (right side in the drawing) from the differential device 6 side. A tip 552a of the cylindrical part 552 faces the side plate 451 of the carrier 45 of the first planetary reduction gear 4 in the rotation axis X direction with a gap being formed.

The cylindrical part 552 is positioned radially outward of the engaging part between the linking part 453 of the first planetary reduction gear 4 side, and the linking part 511 of the second planetary reduction gear 5 side. A bearing B2 fixed to the inner circumference of the opening 140 of the intermediate cover 14 is in contact with the outer circumference of the cylindrical part 552. The cylindrical part 552 of the side plate 551 is supported to be able to rotate on the intermediate cover 14 with the bearing B2 interposed.

With the second planetary reduction gear 5, one side plate 651 of the side plate 551 and the side plate 651 constituting the carrier 55 is formed integrally with the differential case 60 of the differential device 6.

With the second planetary reduction gear 5, the output rotation of the motor 2 reduced by the first planetary reduction gear 4 is inputted to the sun gear 51.

The output rotation inputted to the sun gear 51 is inputted to the stepped pinion gears 53 via the large diameter gear part 531 that engages with the sun gear 51, and the stepped pinion gear 53 rotates around the axis line X2.

Having done that, the small diameter gear part 532 that is integrally formed with the large diameter gear part 531 rotates around the axis line X2 integrally with the large diameter gear part 531.

Here, the small diameter gear part 532 engages with the ring gear 52 fixed to the inner circumference of the case 13. For that reason, when the small diameter gear part 532 rotates around the axis line X2, the stepped pinion gear 53 rotates around the rotation axis X while auto-rotating around the axis line X2.

Having done that, the one end of the pinion shaft 54 is supported on the side plate 651 that is integrally formed with the differential case 60, so in conjunction with the displacement of the stepped pinion gear 53 in the circumferential direction around the rotation axis X, the differential case 60 rotates around the rotation axis X.

Here, with the stepped pinion gear 53, an outer diameter R2 of the small diameter gear part 532 is smaller than an outer diameter R1 of the large diameter gear part 531 (see FIG. 2).

Also, with the second planetary reduction gear 5, the sun gear 51 serves as the input unit of the output rotation of the motor, and the carrier 55 that supports the stepped pinion gear 53 serves as the output unit of the inputted rotation.

Having done that, the rotation inputted to the sun gear 51 of the second planetary reduction gear 5, after being significantly reduced by the stepped pinion gear 53, is outputted to the differential case 60 with which the side plate 651 of the carrier 55 is integrally formed.

As shown in FIG. 1, the differential case 60 is formed to have a hollow shape that internally houses a shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

An inner race B2a of the bearing B2 is press fitted on the outer circumference of a support unit 602. An outer race B2b of the bearing B2 is held by a ring-shaped support unit 131 of the case 13, and the support unit 602 of the differential case 60 is supported to be able to rotate by the case 13 with the bearing B2 interposed.

The drive shaft 8A that penetrates an opening 130 of the case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The drive shaft 8B that penetrates an opening 114 of the cover 11 is inserted in the support unit 601 from the rotation axis direction.

The drive shaft 8B is provided crossing the motor shaft 20 of the motor 2, the sun gear 41 of the first planetary reduction gear 4, and the inner diameter side of the sun gear 51 of the second planetary reduction gear 5 in the rotation axis X direction, and the tip end side of the drive shaft 8B is supported to be able to rotate by the support unit 601.

The lip seal RS is fixed to the inner circumference of the opening 114 of the cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

In the interior of the differential case 60, side gears 63A, 63B are spline fitted at the outer circumference of the tip end part of the drive shafts 8A, 8B, and the side gears 63A, 63B and drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and one end 61a side and another end 61b side of the shaft 61 are inserted.

The one end 61a side and the other end 61b side of the shaft 61 are fixed to the differential case 60 by a pin P, and the shaft 61 is prohibited from auto-rotating around the axis line Y.

The bottom side of the differential case 60 is immersed in the lubricating oil inside the case 13.

With the embodiment, when the one end 61a or the other end 61b of the shaft 61 is positioned at the bottommost side, the lubricating oil is pooled inside the case 13 at least to a height at which the one end 61a or the other end 61b of the shaft 61 is positioned within the lubricating oil.

The shaft 61 is arranged along the axis line Y positioned between the side gears 63A, 63B inside the differential case 60.

The bevel gears 62A, 62B are externally fitted on the shaft 61 inside the differential case 60 and supported to be able to rotate.

Two bevel gears 62A, 62B are provided with a gap being formed in the longitudinal direction of the shaft 61 (axial direction of the axis line Y), and the bevel gears 62A, 62B are arranged in a state so that their teeth face each other. In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the rotation axis X direction.

Two side gears 63A, 63B are provided with a gap being formed in the rotation axis X direction in a state so that their teeth face each other, and the bevel gears 62A, 62B and the side gears 63A, 63B are assembled in a state with the teeth mutually engaged.

The action of the power transmission device 1 of this configuration is explained.

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

When the rotor core 21 rotates around the rotation axis X by the driving of the motor 2, the rotation is inputted to the sun gear 41 of the first planetary reduction gear 4 via the motor shaft 20 that rotates integrally with the rotor core 21.

As shown in FIG. 2, with the first planetary reduction gear 4, the sun gear 41 serves as the input unit of the output rotation of the motor 2, and the carrier 45 that supports the pinion gear 43 serves as the output unit of the inputted rotation.

When the sun gear 41 rotates around the rotation axis X by the output rotation of the motor 2, the pinion gear 43 engaged with the outer circumference of the sun gear 41 and the inner circumference of the ring gear 42 rotates around the axis line X1.

Here, the ring gear 42 is spline fitted to the inner circumference of the intermediate case 12 (fixed side member), and relative rotation with the intermediate case 12 is regulated.

For that reason, the pinion gear 43 revolves around the rotation axis X while rotating around the axis line X1. By doing this, the carrier 45 (side plates 451, 452) that supports the pinion gear 43 rotates around the rotation axis X at a rotation speed lower than the output rotation of the motor 2.

As described above, the linking part 453 of the carrier 45 is linked to the linking part 511 of the sun gear 51 of the second planetary reduction gear 5 side, and the rotation of the carrier 45 (output rotation of the first planetary reduction gear 4) is inputted to the sun gear 51 of the second planetary reduction gear 5.

The output unit (carrier 45) of the first planetary reduction gear 4 is linked with the input unit (sun gear 51) of the second planetary reduction gear 5 without having another member such as a clutch, a shifting mechanism, etc., interposed.

Specifically, the output unit (carrier 45) of the first planetary reduction gear 4, and the input unit (sun gear 51) of the second planetary reduction gear 5 rotate integrally (normally rotate integrally).

Thus, it is possible to make the distance between the first planetary reduction gear 4 and the second planetary reduction gear 5 closer by the amount that the other member is not on the power transmission route, so this contributes to shortening in the axial direction.

With the second planetary reduction gear 5, the sun gear 51 serves as the input unit of the output rotation of the second planetary reduction gear 5, and the carrier 55 that supports the stepped pinion gear 53 serves as the output unit of the inputted rotation.

When the sun gear 51 rotates around the rotation axis X by the inputted rotation, the stepped pinion gear 53 (large diameter gear part 531, small diameter gear part 532) rotates around the axis line X2 by the rotation inputted from the sun gear 51 side.

Here, the small diameter gear part 532 of the stepped pinion gear 53 is engaged with the ring gear 52 fixed to the inner circumference of the case 13. For that reason, the stepped pinion gear 53 rotates around the rotation axis X while auto-rotating around the axis line X2.

By doing this, the carrier 55 (side plates 551, 651) that supports the stepped pinion gear 53 rotates around the rotation axis X at a rotation speed lower than the rotation inputted from the first planetary reduction gear 4 side.

Here, with the stepped pinion gear 53, the outer diameter R2 of the small diameter gear part 532 is smaller than the outer diameter R1 of the large diameter gear part 531 (see FIG. 2).

For that reason, the rotation inputted to the sun gear 51 of the second planetary reduction gear 5 is more greatly reduced by the stepped pinion gear 53 than with the first planetary reduction gear 4, after which it is outputted to the differential case 60 (differential device 6) with which the side plate 651 of the carrier 55 is integrally formed.

Then, the rotation inputted to the differential case 60 is transmitted via the drive shafts 8 (8A, 8B) to the left and right drive wheels (not illustrated) of the vehicle in which the power transmission device 1 is mounted.

In this way, the first planetary reduction gear 4 and the second planetary reduction gear 5 that constitute the reduction mechanism 3 are arranged in series on the transmission route of the output rotation of the motor 2, and one pinion gear of the second planetary reduction gear 5 is used as the stepped pinion gear 53.

This makes it possible to make the reduction ratio greater in the reduction mechanism 3 than when planetary reduction gears having a normal pinion gear (stepless pinion gear) are simply arranged in series in the 1-axis type power transmission device.

As described above, the power transmission device 1 of the present embodiment has the following configuration.

(1) The power transmission device 1 has:
the motor 2,
the first planetary reduction gear 4 connected downstream of the motor 2,
the second planetary reduction gear 5 connected downstream of the first planetary reduction gear 4,
the differential device 6 (differential gear) connected downstream of the second planetary reduction gear 5, and
drive shafts 8 (8A, 8B) connected downstream of the differential device 6.

The drive shaft 8B is arranged penetrating the inner diameter side of the rotor core 21 of the motor 2 (inner circumference of the rotor), the inner diameter side (inner circumference) of the sun gear 41 of the first planetary reduction gear 4, and the inner diameter side (inner circumference) of the sun gear 51 of the second planetary reduction gear 5.

The pinion gear 43 (pinion) of the first planetary reduction gear 4 is a stepless pinion gear, and the pinion gear 53 of the second planetary reduction gear 5 is a stepped pinion gear.

In the 1-axis type power transmission device 1, to increase the reduction ratio of the output rotation of the motor 2, it is possible to add a planetary reduction gear (planetary gear mechanism) on the transmission route of the output rotation of the motor 2.

Here, for the pinion gear of the planetary reduction gear, there is the stepped type for which the reduction ratio is easily increased, and the stepless type for which the size is easily made smaller.

If only aiming for the size of the reduction ratio, it is acceptable to have all the planetary reduction gear pinions be stepped types, but in that case, the power transmission device 1 becomes larger in the radial direction. Specifically, there is still the problem of increased size.

Here, the first planetary reduction gear 4 that is positioned to the downstream side of the motor 2 and to the upstream side of the second planetary reduction gear 5 is provided at a position sandwiched by the motor 2 and the second planetary reduction gear 5, so it is difficult to take space near the first planetary reduction gear 4.

Also, the second planetary reduction gear 5 that is positioned to the downstream side of the first planetary reduction gear 4 and to the upstream side of the differential device 6 is provided between the first planetary reduction gear 4 and the differential case 60 of the differential device 6, so it is easy to take space in the periphery compared to the first planetary reduction gear 4.

In light of that, while applying the stepless pinion to the first planetary reduction gear 4 for which it is difficult to take space in the periphery, by applying the stepped pinion to the second planetary reduction gear 5 for which it is comparatively easy to take space in the periphery, in the 1-axis type power transmission device, it is possible to increase the reduction ratio while suppressing an increase in size.

The power transmission device 1 of the present embodiment has the following configuration.

(2) With the first planetary reduction gear 4, the sun gear 41 is an input element of the output rotation of the motor 2, the carrier 45 is an output element of the rotation outputted from the first planetary reduction gear 4, and the ring gear 42 is a fixed element.

The ring gear 42 that has a ring shape when viewed from the rotation axis X direction is a member positioned at the outermost diameter side in the first planetary reduction gear 4, and is arranged near the inner circumference of the intermediate case 12 (base 120) that is a fixed side member.

When the ring gear 42 is a fixed element, the ring gear 42 merely has to be fixed to the fixed side member arranged in the periphery of that ring gear 42.

When not having the ring gear 42 be a fixed element, in the periphery of the ring gear 42, it is necessary to have space for placing components for inputting and outputting rotation with respect to the ring gear 42, but by having the ring gear 42 be a fixed element, that space is not necessary. Specifically, in the power transmission device 1, it is possible to reduce wasted space in the periphery of the ring gear.

The sun gear 41 is a member positioned furthest to the inner diameter side in the first planetary reduction gear 4, and the motor shaft 20 that outputs the rotation of the rotor core 21 (rotor) of the motor 2 is positioned in the inner diameter side of the power transmission device 1.

By having the sun gear 41 of the first planetary reduction gear 4 be an input element, it is possible to have the output element of the motor 2 (motor shaft 20), and the input element of the first planetary reduction gear 4 side (sun gear 41) be closer in the rotation axis X direction.

This makes it possible to decrease the size of the 1-axis type power transmission device 1 in the rotation axis X direction.

The power transmission device 1 of the present embodiment has the following configuration.

(3) With the second planetary reduction gear 5, the sun gear 51 is an input element of the output rotation of the first planetary reduction gear 4, the carrier 55 is an output element of the rotation outputted from the second planetary reduction gear 5, and the ring gear 52 is a fixed element.

The ring gear 52 that has a ring shape when viewed from the rotation axis X direction is a member positioned at the outermost diameter side in the second planetary reduction gear 5, and is arranged near the inner circumference of the case 13 that is a fixed side member.

When the ring gear 52 is a fixed element, the ring gear 52 merely has to be fixed to the fixed side member arranged in the periphery of that ring gear 52.

When not having the ring gear 52 be a fixed element, in the periphery of the ring gear 52, it is necessary to have space for placing components for inputting and outputting rotation with respect to the ring gear 52, but by having the ring gear 52 be a fixed element, that space is not necessary. Specifically, in the power transmission device 1, it is possible to reduce wasted space in the periphery of the ring gear.

The sun gear 51 of the second planetary reduction gear 5 is a member positioned furthest to the inner diameter side in the second planetary reduction gear 5.

By having the sun gear 51 of the second planetary reduction gear 5 be an input element, and having the carrier 45 of the first planetary reduction gear 4 be an output element, it is possible to have the output element of the first planetary reduction gear 4, and the input element of the second planetary reduction gear 5 be closer in the rotation axis X direction.

This makes it possible to decrease the size of the 1-axis type power transmission device 1 in the rotation axis X direction.

Furthermore, by having the carrier 55 of the second planetary reduction gear 5 be an output element, it is possible to have the output element of the second planetary reduction gear 5, and the differential device 6 (differential gear) be closer in the rotation axis X direction.

This also makes it possible to reduce the size of the 1-axis type power transmission device in the rotation axis X direction.

The power transmission device 1 of the present embodiment has the following configuration.

(4) The carrier 45 of the first planetary reduction gear 4 overlaps the sun gear 41 of the first planetary reduction gear 4 in the rotation axis X axial direction.

The carrier 45 of the first planetary reduction gear 4 is supported by a part that integrally rotates with the sun gear 41 of the first planetary reduction gear 4 with a thrust bearing (needle bearing NB) interposed.

When viewed from the rotation axis X direction, when the carrier 45 of the first planetary reduction gear 4 overlaps the sun gear 41 of the first planetary reduction gear 4, it is necessary to prevent interference (contact) of the two.

Here, there is play in the engagement of the gears of each of the constituent elements of the first planetary reduction gear 4. For that reason, to prevent interference of the carrier 45 and the sun gear 41, it is necessary to expand the clearance in the rotation axis X direction between the carrier 45 side (side plate 451) and the sun gear 41 side (side surface 41b).

The thrust bearing (needle bearing NB) can be formed thinly in the rotation axis X direction.

In light of that, the needle bearing NB is interposed between the carrier 45 (side plate 451) and the sun gear 41 side (side surface 41b), and the carrier side and the sun gear side are supported via the needle bearing NB. Having done that, it is possible to have the carrier 45 (side plate 451) and the sun gear 41 side (side surface 41b) be as close as possible to each other, and possible to reduce the dimension in the axial length direction of the 1-axis type power transmission device having two planetary reduction gears.

Here, the term "connected downstream" in this specification means being in a connection relationship in which the power is transmitted from the components arranged upstream to the components arranged downstream.

For example, in the case of the first planetary reduction gear 4 connected downstream of the motor 2, this means that the power is transmitted from the motor 2 to the first planetary reduction gear 4.

Also, the term "directly connected" in this specification means that the members are connected with the ability to transmit power to each other without the interposition of another member by which the reduction ratio is converted such as a reduction mechanism, an acceleration mechanism, a shifting mechanism, etc.

Above, embodiments of the invention of the present application were explained, but the invention of the present application is not limited to only the modes shown in these embodiments. Changes can be made as appropriate within the scope of the technical concept of the invention.

The invention claimed is:
1. A power transmission device comprising:
a motor including a rotor;
a first planetary reduction gear connected downstream of the motor, the first planetary reduction gear including a sun gear and a pinion gear that is a stepless pinion;
a second planetary reduction gear connected downstream of the first planetary reduction gear, the second plan- etary reduction gear including a sun gear and a pinion gear that is a stepped pinion;

a differential gear connected downstream of the second planetary reduction gear; and a drive shaft connected downstream of the differential gear, the drive shaft penetrating an inner circumference of the rotor of the motor, an inner circumference of the sun gear of the first planetary reduction gear, and an inner circumference of the sun gear of the second planetary reduction gears, the first planetary reduction gear including a carrier having a side plate that is positioned at a differential gear side, the side plate overlapping with the sun gear of the first planetary reduction gear in an axial direction, and the side plate being supported by a part that integrally rotates with the sun gear of the first planetary reduction gear via a thrust bearing.

2. The power transmission device according to claim 1, wherein with the first planetary reduction gear, the sun gear is an input element, the carrier is an output element, and a ring gear is a fixed element.

3. The power transmission device according to claim 2, wherein with the second planetary reduction gear, the sun gear is an input element, a carrier is an output element, and a ring gear is a fixed element.

4. The power transmission device according to claim 1, wherein the first planetary reduction gear includes a first linking part, and the second planetary reduction gear includes a second linking part that is linked to the first linking part of the first planetary reduction gear.

5. The power transmission device according to claim 4, wherein a tip of the first linking part of the first planetary reduction gear faces a side surface of the sun gear of the second planetary reduction gear with a gap being formed therebetween.

6. The power transmission device according to claim 1, wherein the differential gear includes bevel gears housed inside a differential case.

7. The power transmission device according to claim 6, wherein the pinion gear of the second planetary reduction gear is supported by the differential case.

8. A power transmission device comprising:

a motor including a rotor;

a first planetary reduction gear connected downstream of the motor, the first planetary reduction gear including a sun gear and a pinion gear that is a stepless pinion;

a second planetary reduction gear connected downstream of the first planetary reduction gear, the second planetary reduction gear including a sun gear and a pinion gear that is a stepped pinion;

a differential gear connected downstream of the second planetary reduction gear; and a drive shaft connected downstream of the differential gear, the drive shafts penetrating an inner circumference of the rotor of the motor, an inner circumference of the sun gear of the first planetary reduction gear, and an inner circumference of the sun gear of the second planetary reduction gear, the first planetary reduction gear including a first linking part, the second planetary reduction gear including a second linking part that is linked to the first linking part of the first planetary reduction gear, and a carrier of the second planetary reduction gear including a cylindrical part positioned radially outward of an engaging part between the first linking part and the second linking part.

9. The power transmission device according to claim 8, wherein a tip of the cylindrical part faces the first planetary reduction gear with a gap being formed therebetween.

10. The power transmission device according to claim 8, wherein a bearing is arranged on an outer circumference of the cylindrical part.

* * * * *